United States Patent [19]

Fuchshuber

[11] Patent Number: 4,473,871
[45] Date of Patent: Sep. 25, 1984

[54] LIGHTING ARRANGEMENT

[76] Inventor: Franz Fuchshuber, Ebenweilerstr. 5, D-7963 Altshausen, Fed. Rep. of Germany

[21] Appl. No.: 352,096

[22] Filed: Feb. 25, 1982

[30] Foreign Application Priority Data

Mar. 2, 1981 [DE] Fed. Rep. of Germany ... 8105895[U]
Jul. 4, 1981 [DE] Fed. Rep. of Germany ....... 3126427

[51] Int. Cl.$^3$ ............................................. F21V 23/00
[52] U.S. Cl. ..................................... 362/276; 362/74; 362/295; 362/802; 315/84; 315/360
[58] Field of Search ........................... 315/84, 80, 360; 362/74, 276, 295, 802

[56] References Cited

U.S. PATENT DOCUMENTS 4,385,258  5/1983  Voll ...................................... 315/84

FOREIGN PATENT DOCUMENTS 55042  4/1979  Japan .

OTHER PUBLICATIONS

Bailey et al.; "Practical Wireless"; Nov. 1, 1977, pp. 512–513.
Swain; "Electronics, Australia"; Jan. 1980, pp. 42–44.

Primary Examiner—Donald P. Walsh
Attorney, Agent, or Firm—Spencer & Frank

[57] ABSTRACT

A lighting arrangement is proposed which serves, in particular, to illuminate the interior of a motor vehicle. A lighting arrangement which serves, in particular, to illuminate the interior of a motor vehicle. The arrangement comprises a device in the form of a dimmer which includes a power transistor for establishing the connection between the interior lighting connected to the positive pole of a battery and ground when the door light switch is open. A control transistor which is set via a resistor arrangement activates the power transistor. The control transistor is influenced by a charging electrolyte capacitor so that the power transistor becomes highly resistant. Charging of the electrolyte capacitor therefore causes the interior lighting to be slowly extinguished.

5 Claims, 1 Drawing Figure

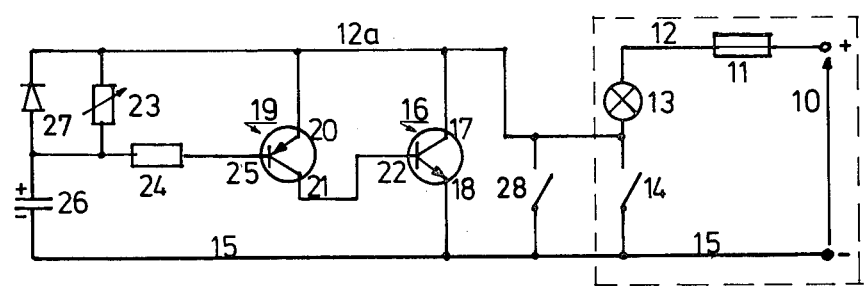

LIGHTING ARRANGEMENT

BACKGROUND OF THE INVENTION

The invention relates to a lighting arrangement, particularly for motor vehicle interiors.

In conventional, series-produced motor vehicles the interior light is generally switched on when a door is opened. By actuating the door contact, the interior light goes out when the door is closed. If interior lighting is required in the motor vehicle even if the door is closed, such light must be manually switched on and also off again. However, such a procedure is generally rather complicated since the switches are usually disposed at an unfavorable location in the motor vehicle and must often be groped for in the dark. This groping for the light switch is usually performed only after futile attempts at starting the motor vehicle or at performing other manupulations in the dark. This often brings about annoyance.

A further inconvenience is encountered in connection with conventional motor vehicle interior lighting arrangements when leaving the vehicle in the dark, for example in an unlighted garage. In this connection, it is likewise very annoying that, after closing of the door, no further light emanates from the motor vehicle so that finding the key hole to lock the car or finding the way to leave the car is rather laborious. As an aid for this problem, small flashlights attached to a key ring or the like have been offered on the market.

To meet this genuine desire for a differently acting interior lighting system for a motor vehicle, an interior lighting arrangement for motor vehicles has become known which continues to operate for a few seconds even after the door has been closed. However, after, for example, 10 to 20 seconds, this light switches off abruptly and all necessary measures must have been taken during this time.

The drawback in such a system is the abrupt switch-off whose impending occurrence can be estimated only with difficulty and which usually catches the user by surprise.

SUMMARY OF THE INVENTION

It is an object of the invention to provide a device which overcomes the drawbacks of the described state of the art and provides, in particular, a motor vehicle interior lighting arrangement in which the light is quite gradually dimmed in a defined period of time to finally be extinguished completely. It is also a particular object of the invention for the device according to the invention to be connectable to any conventional interior lighting system for motor vehicles so as to provide the desired results. A further object of the invention is to enable switching-on of the interior light of the motor vehicle by means of an externally actuated switch.

The object of the invention is accomplished according to the invention by the fact that an electronic accessory is associated with the lighting device so as to effect the known slow dimming of the light.

The arrangement according to the invention has the advantage, compared to the prior art, that the illumination of the interior of a motor vehicle remains in effect even after the door is closed and that the lighting power decreases gradually only after a defined period of time to finally be extinguished completely. This process is particularly pleasing to the eye and occurs completely innocuously. There is no abrupt cut-off of the interior light, i.e. the driver can gradually adjust himself to the onset of darkness. It is a particular advantage that the gradually decreasing light in the interior after closing of the door is beneficial to the driver whether he is in the interior of the motor vehicle or outside thereof. Thus, after the door has closed, he can easily find the hole for the ignition key in the interior of the motor vehicle and can start the motor vehicle. On the other hand, if he leaves the car, he can lock the door and leave the motor vehicle in the illuminated state. In any case, the driver is not suddenly subjected to total darkness. The interior lighting system according to the invention becomes darker only gradually, i.e. one can adjust oneself to it.

According to the invention a particularly cost-effective and simple circuit is employed as the electronic accessory. In known household appliances, such dimming is effected by means of a much more complicated electronic system.

In a particularly advantageous embodiment for carrying out the invention, an electronic circuit is provided for causing slow dimming of a light, particularly a light disposed in the interior of a motor vehicle. The circuit includes a grounded switch which closes the circuit for the electric current when the door is open and switches on an interior lighting device. A power transistor and an electrolyte capacitor are connected in parallel with the switch and means are provided for causing the charging voltage of the electrolyte capacitor to act on the control voltage of the power transistor via a control transistor. In a further feature of the invention the positive pole of the electrolyte capacitor is connected with the base of the control transistor via a series resistor. The emitter of the control transistor and the collector of the power transistor are connected with the positive line while the collector of the control transistor is connected with the base of the power transistor, with the emitter of the latter being grounded. In this way, the object of the invention is met in the simplest manner without requiring the known, complicated electronic measures.

It is another particular feature of the invention that a variable resistor acts on the base of the control transistor. With this measure, the duration of the illumination can be set to be infinitely variable.

In another advantageous aspect of the invention a diode is provided between the positive pole and the electrolyte capacitor. This diode prevents destruction of the electronic circuit, particularly of the control transistor and of the electrolyte capacitor, due to inadvertent incorrect connection of the terminals when the device is installed.

In a further aspect of the invention a reed contact is provided in parallel with the door switch so as to short-circuit the switch. Instead of this switch, an inductive proximity switch, a sensor, a switch button or the like may also be provided. Such switches serve to switch on the interior light also when the door is not opened. The switches should be selectively actuatable from outside the motor vehicle (reed contact, proximity switch) or from the interior of the motor vehicle (switch button). This is of advantage, for example, if the unlighted motor vehicle must first be unlocked from the outside or if, during a trip, light is temporarily required in the interior.

The circuit is advantageous encased in a housing which is substantially inflammable. With this measure it is possible to cool the power transistor without undue expense. Moreover, the electrical terminals of the circuit are properly protected.

BRIEF DESCRIPTION OF THE DRAWINGS

The sole FIGURE in the drawing is a circuit diagram of the device according to the invention.

DESCRIPTION OF THE PREFERRED EMBODIMENTS

On the right side, the FIGURE shows the conventional portion of a motor vehicle interior lighting arrangement. The interior light 13 is connected to the positive pole of a voltage source 10 via the fuse 11 and the positive line 12, and to the negative pole via the door switch 14 and the negative line 15. In the drawing, the switch 14 is open (door closed), i.e., in conventional motor vehicles the interior light 13 is off.

With the device according to the invention the ground connection to the bulb 13, which is missing when switch 14 is open, is established via a power transistor 16, whose collector 17 is connected with bulb 13 and whose emitter 18 is connected with the ground pole 15.

The power transistor 16 is actuated by a control transistor 19 whose emitter 20 is likewise connected with the bulb 13 and whose collector 21 is connected with the base 22 of the power transistor 16.

In order to actuate the control transistor 19, a controllable series resistor 23 and a resistor 24 are provided which act on the base 25 of the control transistor 19. The controllable series resistor 23 is likewise connected with the line 12a for the bulb 13 (positive pole).

Additionally, an electrolyte capacitor 26 is provided in parallel with the power transistor 16 and its positive pole is connected with the bulb 13 while its negative pole is connected to ground. In order to avoid damage to the device when the poles ae interchanged, a diode 27 is provided between the positive pole (line 12a) and the control transistor 19 or the electrolyte capacitor 26, respectively.

The apparatus operates as follows:

When the vehicle doors are closed and thus the door contact switch 14 is opened, the electrolyte capacitor 26 slowly charges itself. The control transistor 19 (pnp transistor) has its emitter 20 connected to the positive pole (line 12a). Due to the charging process of the electrolyte capacitor 26, the base 25 of transistor 19 is more negative than the emitter 20, i.e., transistor 19 is conductive and actuates, via collector 21, the base 22 of the power transistor 16 (npn transistor). This causes power transistor 16 to become conductive and current flows from collector 17 to emitter 18. Then current flows through bulb 13, line 12a, through the collector 17 and the emitter 18 of power transistor 16 to the ground line 15 of the circuit arrangement. Bulb 13 thus lights up even if switch 14 is open, i.e. the door is closed.

With increasing charge saturation of the electrolyte capacitor 26, the voltage across the base 25 of transistor 19 increases and the passage of current decreases. Thus the control transistor 19, via its collector 21, actuates the base 22 of power transistor 16 in such a way that transistor 16 becomes increasingly more resistant, i.e. the current flow through power transistor 16 decreases. When the electrolyte capacitor 26 is approximately saturated, no further current flows through power transistor 16, causing bulb 13 to be extinguished. By setting the series resistor 23, the time of extinction can be controlled. Approximately 20 to 30 seconds have been found to be favorable values.

Diode 27 prevents destruction of the control transistor 19 or of the electrolyte capacitor 26 due to inadvertent connection of its terminals to incorrect poles when the dimmer is installed.

When the door is opened, door switch 14 is closed and the interior lighting 13 is switched on again in the conventional manner. In this case, the circuit according to the invention is inevitably short-circuited, i.e. the electrolyte capacitor discharges. If the door contact switch 14 is opened, the operational sequence begins anew.

In order to make the system independent of the door switch 14, a further switch 28 may be provided which serves to short-circuit the charged electrolyte capacitor 26. This may be a switch button in the interior of the motor vehicle, the brief actuation of which immediately causes the interior lighting 13 to light up and, according to the invention, the light intensity to decrease gradually. However, switch 28 may also be a switch which can be accessed from outside the motor vehicle so that the interior light may be switched on from outside. This could be accomplished particularly well with a reed contact (magnetic switch), a proximity switch or some other suitable sensor.

Advantageously the circuit according to the invention is encased in a housing so as to provide the required cooling for power transistor 16 and to protect the circuit against extraneous influences. The outwardly directed connecting lines are advisably made somewhat thicker (1.5 mm)$^2$ so as to simultaneously impart a certain support to the housing.

The following components have been found satisfactory for equipping the circuit according to the invention:

Power transistor 16: npn transistor BD 243 C
Control transistor 19: pnp transistor BC 307 B
Electrolyte capacitor 26: 100 μF
Diode 27: 1N 4003
Resistor 23: 10 to 22 k
Resistor 24: 1 k The invention can be operated without difficulty with a battery voltage between 12 and 14 Volt without requiring any modification of components.

The device according to the invention can of course also be used with different motor vehicle lights which are to perform a similar function.

I claim:

1. Lighting arrangement, particularly for the interior of a motor vehicle, having electronic circuit means for causing slow dimming of the light, said circuit means comprising a grounded switch which closes the circuit for the electric current when the door is open and switches on an interior lighting device; a power transistor and an electrolyte capacitor which are connected in parallel with said switch; a reed switch connected in parallel with said switch for short circuiting said electrolyte capacitor; and means for causing the charging voltage of the electrolyte capacitor to act on the control voltage of the power transistor via a control transistor wherein the positive pole of the electrolyte capacitor is connected with the base of the control transistor via a series resistor, the emitter of the control transistor and the collector of the power transistor being connected with the positive line while the collector of the control transistor is connected with the base of the power transistor, and the emitter of the latter being grounded.

2. Lighting arrangement according to claim 1, wherein a variable resistor acts on the base of the control transistor.

3. Lighting arrangement according to claim 1, wherein a diode is provided between the positive line and the electrolyte capacitor.

4. Lighting arrangement according to claim 1, wherein the electronic circuit means is encased in an inflammation-resistant housing.

5. A dimming circuit for connection to a lighting arrangement in which a light is connected to a voltage source and is in series with a switch having a first terminal connected to the light and a second terminal connected to ground, said circuit comprising:

a power transistor;

connecting means for connecting the collector of said power transistor to the first terminal of the switch and the emitter of said power transistor to the second terminal of the switch;

a capacitor having a negative pole connected to the emitter of said power transistor and a positive pole connected for receiving a charging current from the voltage source when said circuit is connected to the lighting arrangement and the switch is open;

a reed switch connected in parallel with the switch for short-circuiting said capacitor; and a control transistor having an emitter connected to the collector of said power transistor, a collector connected to the base of said power transistor, and a base connected to the positive pole of said capacitor;

wherein the increasing charge at the positive pole of said capacitor increases the voltage applied to the base of said control transistor and decreases the conductivity of the emitter-collector path of said control transistor, which in turn decreases the conductivity of the collector-emitter path of said power transistor.

* * * * *